United States Patent
Micko et al.

(10) Patent No.: US 12,536,886 B2
(45) Date of Patent: Jan. 27, 2026

(54) TECHNIQUES FOR OPTIMIZING MOTION DETECTION USING PIR DETECTORS

(71) Applicant: Amazon Technologies, Inc., Seattle, WA (US)

(72) Inventors: Eric S. Micko, San Jose, CA (US); Sonny Windstrup Rasmussen, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 18/345,202

(22) Filed: Jun. 30, 2023

(65) Prior Publication Data

US 2025/0006026 A1 Jan. 2, 2025

(51) Int. Cl.
*G08B 13/191* (2006.01)
*G08B 13/196* (2006.01)

(52) U.S. Cl.
CPC ....... *G08B 13/191* (2013.01); *G08B 13/1961* (2013.01); *G08B 13/1966* (2013.01)

(58) Field of Classification Search
CPC .............. G08B 13/191; G08B 13/1961; G08B 13/1966; G08B 29/185; G01J 5/02; G01J 5/34
See application file for complete search history.

(56) References Cited

U.S. PATENT DOCUMENTS

| | | |
|---|---|---|
| 4,614,938 A | 9/1986 | Weitman |
| 4,963,749 A | 10/1990 | McMaster |
| 5,764,146 A * | 6/1998 | Baldwin .................. G01J 5/34 250/221 |
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |

(Continued)

OTHER PUBLICATIONS

International Search Report and Written Opinion, Corresponding to International Application No. PCT/US2024/036265, mailed Dec. 16, 2024, 20 pages.

*Primary Examiner* — David P Porta
*Assistant Examiner* — Mamadou Faye
(74) *Attorney, Agent, or Firm* — Eversheds Sutherland (US) LLP

(57) ABSTRACT

This disclosure describes techniques for optimizing motion detection in systems that use passive infrared (PIR) detectors. The techniques comprise generating a first signal and a second signal by two sets of detector elements. The techniques further involve calculating a sum of the first signal and the second signal as well as a difference between the first signal and the second signal. The techniques may comprise determining whether a slope of either the sum or the difference exceeds a threshold slope value. If the slope exceeds the threshold slope value, a determination may be made as to whether an amplitude of the sum or difference exceeds a detection threshold. If the amplitude does exceed the detection threshold, then a motion detection event is detected. If the slope does not exceed the threshold slope value, the first signal and the second signal are zeroed out.

24 Claims, 14 Drawing Sheets

(56) References Cited

U.S. PATENT DOCUMENTS

| | | |
|---|---|---|
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2001/0006367 A1 | 7/2001 | Oda |
| 2012/0292510 A1* | 11/2012 | Tanaka ............ G01V 9/005 250/338.3 |
| 2018/0151039 A1* | 5/2018 | Lemberger ........ H04L 12/4625 |
| 2020/0111335 A1* | 4/2020 | Gagnon ............ G06V 20/52 |

\* cited by examiner

TECHNIQUES FOR OPTIMIZING MOTION DETECTION USING PIR DETECTORS

BACKGROUND

Motion Sensors utilizing infrared (IR) radiation detectors are often used in security systems or lighting systems to detect movement in a monitored space. For example, a passive infrared (PIR) detector might be configured to detect changes in infrared (IR) radiation caused by temperature differences between a warm object, such as a warm-blooded animal, and its background environment as the warm object moves through that environment. Upon detection of motion, motion sensors typically transmit an indication that motion has been detected. Such a signal may be used by an electronic device to initiate one or more actions, such as turning on lights, capturing images using a camera, or activating an alarm.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
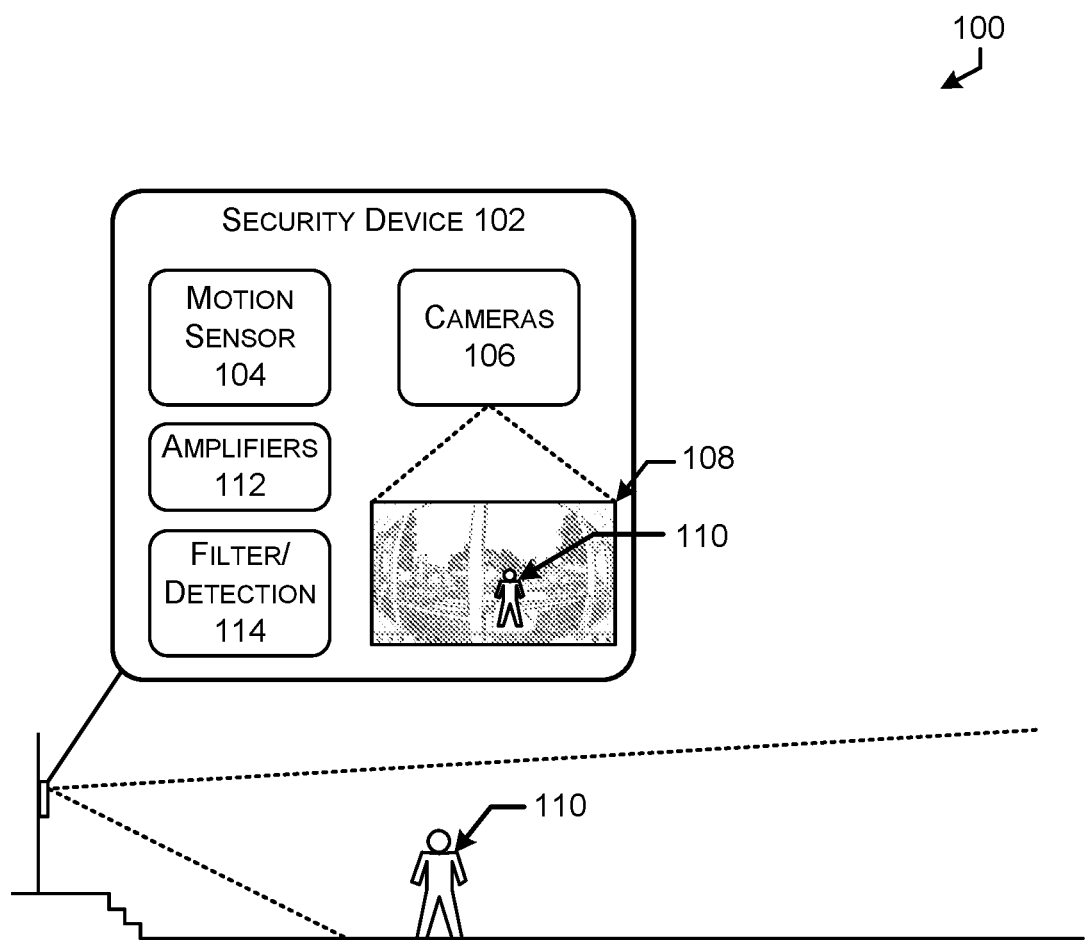
FIG. 1 depicts an example environment in which one or more motion sensors may be implemented in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, techniques for performing optimized motion detection when using a PIR detector. Such techniques may involve improved noise filtering as well as signal amplification that can be used to more accurately identify moving objects, and particularly object movements that would generally produce low frequency signals that may be ignored in conventional motion detection systems.

In accordance with one or more implementations, signals generated by detector elements in a PIR detector (or values determined based on such signals) are enhanced or amplified by being added to each other and subtracted from one another. This can have the effect of exaggerating the signals, making motion easier to detect.

Additionally, in accordance with one or more implementations, noise filtering can be utilized which involves determining that fluctuations in a signal are noise based on a calculated slope of the signal with respect to a period of time. If the fluctuations are determined to be noise (e.g., based on the slope failing to exceed a threshold slope value), then the signal is recentered or zeroed out to obviate false positives.

In embodiments, a determination that a motion event has occurred is made based on whether an amplitude value for one or more signals or calculated values (e.g. a signal representing a sum or difference or a signal representing an absolute value or sum of absolute values) has exceeded a detection threshold that indicates a motion detection event.

In some cases, multiple detection thresholds may be used to identify motion detection events. For example, a positive detection threshold (e.g. 3) and a negative detection threshold (e.g. −3) may both be used, such that an amplitude of a signal that is greater than the positive detection threshold, or less than the negative detection threshold, may trigger a motion detection event. In one or more implementations, a motion detection event may be identified if either of added signals or subtracted signals exceeds either of the respective detection thresholds.

Embodiments of the disclosure provide for a number of advantages over conventional systems. For example, while conventional motion sensors that use PIR detectors can provide excellent detection of objects crossing a field of view (FOV) of the PIR detectors, they can have difficulty detecting objects moving directly toward or away from the motion sensor. This may be because of gaps in an FOV of the motion sensor. Additionally, because of the use of a detection threshold to filter noise, conventional motion sensor using PIR detectors may also have difficulty detecting objects that produce low-frequency signals, such as slowmoving objects. Embodiments of the disclosure provide techniques for improving the accuracy of motion sensors in each of the above situations.

Additionally, embodiments allow for more accurate filtering of noise, allowing a detection threshold to be set lower, so that the system is better able to identify objects that generate low frequency signals. One potential issue with the use of PIR detectors in motion detection is that drift or noise can accumulate in a signal generated by the PIR detector. For example, an accumulation may occur as the environment in which the PIR detector is located changes temperature throughout the day. Such an accumulation may be more prevalent in environments which are heated or cooled unevenly, for example. In systems that use a detection threshold when detecting motion, such an accumulation might cause an amplitude of a generated signal to exceed that detection threshold when it would not have exceeded the detection threshold absent the accumulation. Accordingly, in conventional motion detection systems, this accumulation can cause false positives to occur. By more accurately identifying noise accumulation based on signal slope as disclosed, accumulation can be reset or "zeroed out," thereby reducing the risk of false positives occurring.

FIG. 1 depicts an example environment in which one or more motion sensors may be implemented in accordance with some embodiments. In the example environment 100, a security device 102, such as a video doorbell device, may be used to monitor a space. In embodiments, the security device 102 may include at least a motion sensor 104 and one or more cameras 106. The motion sensor 104 may have a field of view (FOV) that overlaps at least partially with a FOV of the one or more cameras.

In many cases, a security device 102 is installed at a site (e.g., a home or business) and typically around an access point (e.g., a door) for that site. The security device 102 may remain in a low-power mode while no activity is being detected. This allows the security device 102 to conserve battery life. However, the security device 102 may be configured to wake up or activate upon detecting one or more conditions have been met. For example, the security device 102 may be configured to exit the low power mode when motion is detected by the motion sensor 104. Upon exiting the low power mode, the security device 102 may be further configured to activate one or more of the cameras 106 in order to capture image data 108.

The motion sensor 104 is a device for detecting motion in a monitored space. A motion sensor may include one or more infrared detectors, one or more optical elements (e.g. a Fresnel lens or lens array) shaped and arranged to direct electromagnetic radiation from the monitored space onto the infrared detector(s), and circuitry to receive information related to motion from the infrared detector(s) and take action based on that information. Any type of action can be taken, but various embodiments take actions such as, but not limited to, sounding an audible alarm, turning a light on or off, or sending a message indicating that motion was detected.

In embodiments, the motion sensor 104 may include at least one PIR detector that is configured to detect changes in temperature caused by a warm object (e.g., a person or animal) entering the FOV of the PIR detector. The use of a PIR detector can be ideal for motion detection purposes in security devices that use a low-power mode because of their minimal power consumption. However, while conventional PIR detectors can provide excellent detection of objects crossing the FOV of the PIR detector, they can have difficulty detecting objects moving directly toward or away from the PIR detector.

In the depicted example, the security system 102 is configured to (e.g., via cameras 106) capture an image 108 that depicts an object 110 that approaches the security device 102. When the security device 102 is installed at a door to a building, for example, the motion of the object 108 would typically involve a motion substantially toward the security device 102. However, as noted above, conventional systems using PIR detectors may be less accurate when detecting objects that are moving toward the PIR detector.

In order to improve the accuracy of the PIR detector in detecting motion, the security device 102 may include one or more amplifiers 112 and one or more filter/detection components 114. In embodiments, the amplifiers 112 are configured to amplify a signal generated by at least two pairs of detector elements of a PIR detector in a motion sensor by calculating a sum and a difference of those signals. The filter/detection component 114 are configured to detect noise based on a slope of the signal with respect to time. In such cases, if the slope is less than a threshold slope value for a period of time, then the signal may be considered noise. Upon detecting noise, the filter/detection component 114 may zero out, or reset, the signals generated based on the two pairs of detector elements (or modify a threshold for detection and threshold for noise filtering).

To determine whether a signal represents detected motion, a determination is made as to whether an amplitude of the signal has exceeded a detection threshold. The PIR detector may be configured to generate a motion signal to be provided to another electronic component upon detecting that a signal has exceeded the detection threshold.

A PIR detector may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g., junction field effect transistors) or operational amplifiers are used to convert charge into a signal voltage.

A PIR detector may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A PIR detector may include two slots, each providing an optical path to one of the pyroelectric sensing elements. A device may comprise one or more lenses configured to direct light received at the one or more lenses onto one of the pyroelectric sensing elements. A device may include one or more lenses configured to direct light received at a first portion of the one or more lenses (e.g., a left portion) onto a first of the pyroelectric sensing elements (e.g., a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g., a horizontal axis or a vertical axis).

A PIR detector may be analog, with an analog signal output, or may be digital, with digital data output generated utilizing an analog-to-digital converter (ADC).

In accordance with one or more implementations, a PIR detector may comprise four pyroelectric sensing elements, representing two pairs of pyroelectric sensing elements electrically coupled together with opposite polarization to produce an output. For each pair, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

Such a PIR detector may include four slots, each providing an optical path to one of the pyroelectric sensing elements. A device may comprise one or more lenses configured to direct light received at the one or more lenses onto one of the pyroelectric sensing elements. The one or more lenses may comprise one or more Fresnel lenses having one or more features configured to direct light. The pyroelectric elements may be positioned side by side and aligned along an axis (e.g., a horizontal axis or a vertical axis).

In such a PIR detector, the pyroelectric sensing elements may be interleaved, with a one of a first pair of coupled pyroelectric sensing elements disposed between the two pyroelectric sensing elements of the second pair, and one of the second pair of coupled pyroelectric sensing elements disposed between the two pyroelectric sensing elements of the first pair.

A PIR detector may be analog, with an analog signal output, or may be digital, with digital data output generated utilizing an analog-to-digital converter (ADC).

In accordance with one or more implementations, output from a first pyroelectric sensing element of a coupled pair is added to, subtracted from, or combined with output from a second pyroelectric sensing element of the coupled pair. For example, signals may be added with a summing amplifier, or data may be generated based on the signals using an ADC and determined values summed together (e.g., using an integrated circuit component). Similarly, signals may be subtracted using a differential amplifier, or data may be generated based on the signals using an ADC and subtraction performed using determined values. One of the pair is associated with a first polarity, and one of the pair is associated with a second polarity.

As noted above, for the pair, an equal change in temperature at both of the pyroelectric sensing elements will cancel out in the output signal or output data, thus filtering out temperature changes in the environment. However, a change in temperature at only one of the pyroelectric sensing elements will result in an output signal or output data that is positive or negative (depending on which pyroelectric sensing element experienced the change in temperature).

Output from pyroelectric elements of a second coupled pair is similarly handled. The result is two output signals or determined data, each representing a signal or data from one of the coupled pairs. Each of these coupled pairs can be characterized as representing a channel, and thus each of the output signals or data can be characterized as being associated with a channel.

In accordance with one or more implementations, these output signals or data are utilized together or combined to facilitate motion detection.

In accordance with one or more implementations, a first absolute value is determined based on an output signal or data from the first pair, and a second absolute value is determined based on an output signal or data from the second pair. Where the output was an output signal, an ADC is utilized to determine corresponding data, and the data is used to determine an absolute value. For example, in an exemplary architecture, an analog detector provides output in the form of two signals, one for each pair of coupled pyroelectric sensing elements, and an IC component providing ADC functionality is utilized to generate digital data for each analog signal. This IC component may also perform filtering (e.g., bandpass filtering) on the analog signal and/or on resultant data.

Digital data generated by the IC component is then communicated to a microcontroller, which may provide filtering (e.g., as described in more detail hereinbelow), and then data may be used to generate an absolute value.

The first absolute value determined based on the first coupled pair of pyroelectric sensing elements is added to the second absolute value determined based on the second coupled pair of pyroelectric sensing elements. This summed value is then compared to a threshold.

This comparison may be used to determine whether motion has been detected.

For example, based on this comparison, a microcontroller may output a signal or send data indicating that motion has been detected.

An electronic device (such as a camera device) may include one or more PIR detectors that the electronic device uses to detect motion of objects. Each PIR detector may output a signal or sensor data, where the signal or sensor data indicates whether the PIR detector detected an object.

For example, a first PIR detector may have a first field of view (FOV) that extends a first distance from the electronic device. In some examples, the first FOV is created based on placing the first PIR detector in a first direction and/or using one or more lenses (which may be a lens of the PIR detector, or which may be a lens used in addition to or in replacement of a lens of the PIR detector).

In some example systems, if motion is detected in an environment monitored by a motion sensor such as a PIR detector, the triggered motion sensor may send a signal to a controller of a camera device comprising the motion sensor. The signal may be effective to cause the camera device(s) to begin capturing image data and/or video data. For example, camera device comprising a PIR detector may be situated in a particular room of a building. If the PIR detector is triggered (e.g., due to a human walking through the room), the PIR detector may send a signal to the controller of the camera device indicating that motion has been detected by the PIR detector. In response to receipt of the signal from the PIR detector, the camera device may be configured to begin capturing video. In some example systems, a communication such as a motion alert or other event data may be sent using a wireless communication component based on detected motion. In accordance with one or more implementations, a motion detection signal or data from a PIR detector triggers powering up of a camera and generation of image data, and this image data is then used to verify, or not verify, detection of motion or a specific type of object (e.g. a person). This verification may be based on pixel-based motion detection, on computer vision based object detection using a machine learning model, etc.

In accordance with one or more preferred implementations, a PIR detector includes an integrated circuit (IC) component that receives voltage inputs from one or more lines coupled to a first pyroelectric sensing element and a second pyroelectric sensing element. In accordance with one or more preferred implementations, the IC component receives an input from each sensing element, while in accordance with one or more preferred implementations, the IC component receives a summed, subtracted, or combined voltage.

In accordance with one or more preferred implementations, an IC component determines whether a summed, subtracted, or combined voltage exceeds a first threshold, and, if so, sends a logic signal (e.g., a Boolean value or an interrupt) to a microcontroller or another IC component or controller. Based on the received logic signal, the microcontroller or another IC component or controller begins periodically polling or requesting PIR data (e.g., a most recent data value at the time of polling) from the first IC component. For example, the controller may poll the IC component at a rate of 64 Hz. In accordance with one or more implementations, the logic signal represents an interrupt that triggers additional processing.

As noted above, in accordance with one or more implementations, a first absolute value determined based on a first coupled pair of pyroelectric sensing elements is added to a second absolute value determined based on a second coupled pair of pyroelectric sensing elements, and a comparison of this summed value to a threshold is used to determine whether motion has been detected. In accordance with one or more implementations, rather than using such an approach involving absolute values, a sum value is determined based on adding a first value generated from a first coupled pair of pyroelectric sensing elements to a second value generated from a second coupled pair of pyroelectric sensing elements, and a difference value is determined based on adding a first value generated from a first coupled pair of pyroelectric sensing elements to a second value generated from a second coupled pair of pyroelectric sensing elements. Each of the sum and difference values is then compared to a respective threshold to determine whether motion has been detected. In some implementations, an absolute value of the sum value might be compared to a first threshold, and an absolute value of the difference value might be compared to a second threshold. In some implementations, absolute values are not utilized.

In various approaches described herein, operations may be performed in hardware on analog signals, e.g., using summing amplifiers and difference amplifiers, or performed with software or firmware on digital data, e.g., using electronic processors. In various approaches, different integrated circuit components may be utilized to provide various functions and components, e.g., analog to digital converters, summing amplifiers, difference amplifiers, bandpass filters, etc.

As noted above, in accordance with one or more implementations, output from a first pyroelectric sensing element of a coupled pair is added to, subtracted from, or combined with output from a second pyroelectric sensing element of the coupled pair, and output from pyroelectric elements of a second coupled pair is similarly handled. The result is two output signals or determined data, each representing a signal or data from one of the coupled pairs. Each of these coupled pairs can be characterized as representing a channel, and thus each of the output signals or data can be characterized as being associated with a channel.

In accordance with one or more implementations, a microcontroller is configured to provide non-linear filtering functionality for data derived from such signals.

For example, in accordance with one or more implementations, data associated with a first channel indicates signal values at various times. When a current signal value is determined to exceed a first threshold, a slope is determined based on recent signal values. If the slope does not exceed a second threshold, then the microcontroller operates to recenter or rezero the data processing, e.g., based on setting a reference or offset value to be equal to the current signal value that triggered the slope calculation. In accordance with one or more implementations, a reference or offset value is determined based on an average value over an amount of time, e.g., is set to be equal to an average value for a first period of time prior to a determination based on a determined slope. Subsequent signal values are adjusted by the reference or offset value prior to processing, e.g., prior to comparison to the first threshold. Alternatively, in some implementations, the first threshold may be adjusted. An identical approach is utilized for data associated with the second channel, which has its own third threshold (for signal values) and fourth threshold (for slopes).

In accordance with one or more implementations, such adjusted signal values that are adjusted by determined reference or offset values are utilized for calculation of absolute values or sum or difference values used to determine whether motion has been detected. In accordance with one or more implementations, a threshold used for such detection may be adjusted based on an offset or reference value in lieu of adjusting signal values.

In accordance with one or more implementations, absolute values or sum or difference values may be determined with unadjusted signal values, and the absolute value or sum or difference values compared to a first threshold to determine whether to calculate a slope and potentially rezero or recenter the values in the same manner as just discussed for signal values.

Figure 2:
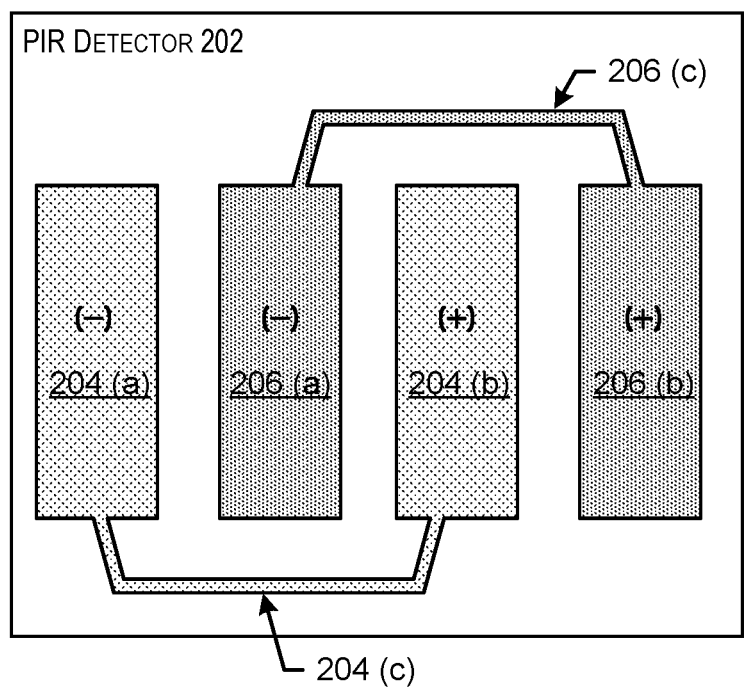
FIG. 2 depicts an example of a PIR detector that may be included in a motion sensor in accordance with embodiments.

FIG. 2 depicts an example of a PIR detector that may be included in a motion sensor in accordance with embodiments. Note that while the PIR detector 202 depicted in FIG. 2 includes two pairs of detector elements, other embodiments may include greater or fewer detector elements.

As discussed above, many PIR detectors include a pair (or pairs) of equally sized detector elements of opposing polarities. In the depicted example, the PIR detector 202 includes two pairs of such detector elements, 204(a-b) and 206(a-b). Each of the pairs of detector elements includes a detector element having a negative polarity 204-206 (a) and a detector element having a positive polarity 204-206 (b). The detector elements of each pair are connected via a conductive pathway 204-206 (c), such that charge is able to flow from one of the detector elements in the pair to the other. In other words, when one of the detector elements changes temperature, charge is allowed to flow to or from that detector element and to or from the other detector element in the pair over the respective conductive pathway.

As depicted, multiple pairs of detector elements may be interleaved in a manner that optimizes a field of view of the PIR detector 202. For example, one of the detector elements from a first pair may be positioned between the detector elements of a second pair. Note that because of the opposite polarities of the detector elements in a pair, detection of an object or objects by both detector elements simultaneously may have a cancelling effect. For example, when an object causes the temperature of both detector elements to change at the same time, there may be no net change in charge between the detector elements. This may be caused by an object moving within a field of view for each of the detector elements, for example. Accordingly, it may be advantageous to ensure that individual detector elements of a pair of detector elements are sufficiently separated such that they do not detect the same object. However, this may leave a gap in the field of view for the PIR detector 202. Hence, by interleaving the detector elements of multiple detector element pairs in the manner shown, such gaps can be eliminated, thereby optimizing the field of view for the PIR detector.

In the depicted PIR detector 202, non-focused out-of-band radiation, as well as ambient temperature changes or physical shock, is equally incident on both detector elements, thus causing the signals from the opposite elements to roughly cancel one another.

Figure 3:
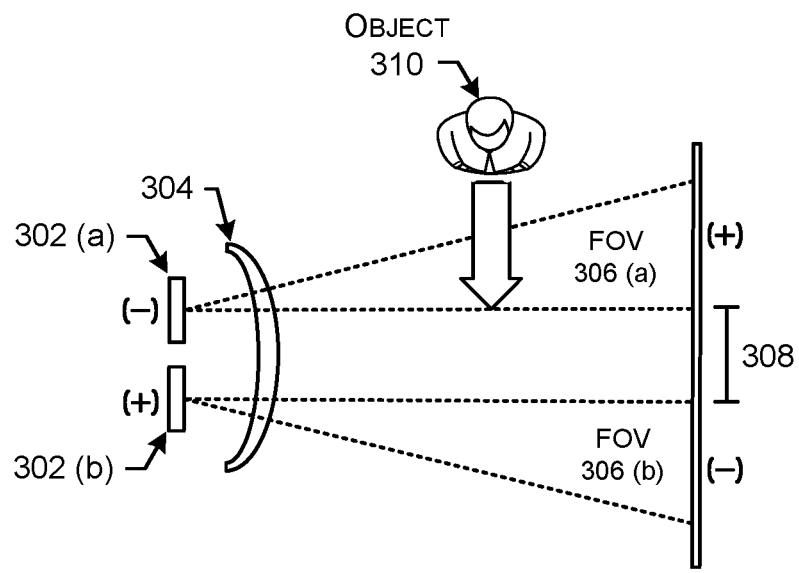
FIG. 3 depicts an illustration of an object detection process as performed by a PIR detector in accordance with at least some embodiments.
Figure 3:
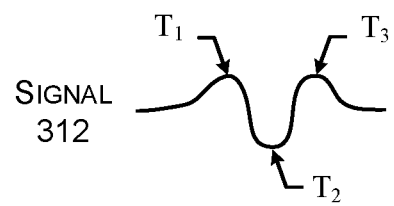

FIG. 3 depicts an illustration of an object detection process as performed by a PIR detector in accordance with at least some embodiments. The object detection process may be performed using the PIR detector 202 as described in relation to FIG. 2 above.

As noted elsewhere, a PIR detector may include at least one pair of detector elements 302 (a and b) each having opposite polarity (+ or −). Additionally, the PIR detector may incorporate an optical array 304 (comprised of optical elements, such as lenses, focusing mirrors, and so on) to be able to monitor a large space with a single detector. The optical array 304 directs the IR radiation from multiple monitored volumes onto the detector, which sometimes includes filters to minimize the radiation outside of the desired frequency or wavelength range from reaching the detector.

As shown, the detector elements 302 of the PIR detector may be situated behind the optical array 304 (e.g., a lens). Each of the detector elements 302 may, when paired with the optical array 304, have a respective field of view (FOV) 306 (a and b). A FOV of the PIR detector may be made up of the individual FOVs of each of its detector elements.

As noted in FIG. 2 above, the FOV for two detector elements in a pair of detector elements may be separated to avoid having an object detected by both detector elements simultaneously. Hence, there may exist some gap 308 between the two detector elements in the pair of detector elements 302. However, as also noted, while not shown in the FIG. 3, the PIR detector may include multiple pairs of interleaved detector elements, which reduces the size of gaps in the PIR detector FOV.

Motion sensors that use PIR detectors are well suited to detecting motion of an object 310 that crosses the FOV of the PIR detector. In such cases, a signal 312 is generated with respect to time as the object 310 moves across the FOV of the PIR detector. Such a signal 312 may, at time $T_1$ as the object 310 moves into the FOV 306 (a) of the detector element 302 (a), generate a positive signal (e.g., represented as a positive voltage) as the object causes the detector element 302 (a) to heat up. Since the detector elements 302 effectively measure a change in temperature, an increase in temperature results in an increase in positive signal.

Once the object 310 has passed through the FOV 306 (a) and begins to enter the FOV 306 (b), the signal 312 may revert from positive to negative. Note that a negative signal will be generated by detector element 302 (a) as its temperature is now dropping (e.g., resulting in a negative change in temperature). Additionally, detector element 302 (b) produces a negative signal since it has a reversed polarity from detector element 302 (a). Accordingly, the signal 312, at time $T_2$, would represent the sum of the negative signals generated by both detector elements 302 (a) and 302 (b).

Once the object 310 has passed through the FOV 306 (b), the temperature of the detector element 302 (b) will return to normal. Since the temperature is decreased (and since the polarity is opposite), a positive signal is generated.

As would be recognized by one skilled in the art, an object 310 passing through the FOV of a PIR detector may create a signal 312 that is somewhat sinusoidal in nature. Note that while the signal representing the object detection is depicted as having a negative portion surrounded by two positive portions, the opposite may be true if the object 310 enters the PIR detector FOV from the opposite direction. In such cases, the signal representing the object detection may depict a positive portion surrounded by two negative portions.

Figure 4:
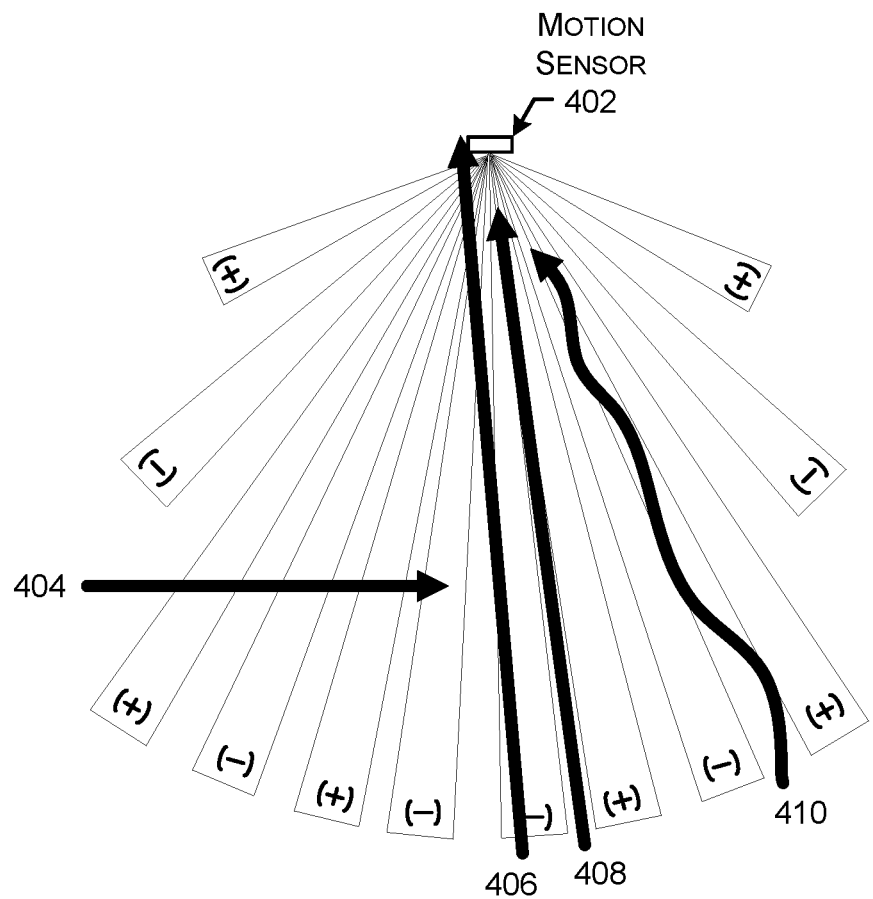
FIG. 4 depicts an example of a top-down view for a FOV that may be implemented on a motion sensor in accordance with at least some embodiments.

FIG. 4 depicts an example of a top-down view for a FOV that may be implemented on a motion sensor in accordance with at least some embodiments. The motion sensor 402 may include a number of PIR detectors, each of which include at least one pair of detector elements, arranged horizontally. More particularly, the motion sensor 402 may include a horizontal arrangement of two PIR detectors, each having two pairs of detector elements.

The FOV of a motion sensor 402 may be made up of FOVs for individual detector elements. Each of the FOVs of the individual detector elements may be associated with a polarization for the respective detector elements. As depicted, a FOV for a motion sensor may include gaps (also called canyons or trenches) between FOVs of individual detector elements within the motion sensor. In some cases, each two pairs of detector elements may be interleaved in order to reduce or eliminate gaps between the individual FOVs.

Depicted in relation to the FOV of the motion sensor 402 are multiple exemplary paths (404-410) that may be taken by an object moving through that FOV. As noted in relation to FIG. 3 above, an object moving across multiple of the individual FOVs along exemplary path 404 would create a strong signal that would likely be easily detectable. However, an object traveling along paths 406, 408, and 410 toward the motion sensor 402 may generate weaker signals that may be harder to detect.

Moving along the path 406 toward the motion sensor 402 may take an object largely through a single detector element FOV though the object may pass through other detector element FOVs as well. In such cases, exiting and entering detector element FOVs may be easily detected, whereas the object's movement through a single detector element FOV may produce a weaker signal that is harder to detect. It should be noted that detection of an object traveling along the path 406 may be optimized using the techniques described herein.

Moving along the path 408 may take that object through a gap between FOVs of individual detector elements, meaning that the object is unlikely to be detected until that object is close enough to the motion sensor 402 that it cannot fit within the gap. It should be noted that objects can be prevented from traveling along path 408 by eliminating the gaps between FOVs of individual detector elements.

Path 410 may represent a more realistic path of a person traveling through the motion sensor 402 FOV. More particularly, a person walking through an area typically has a tendency to sway from side to side as that person moves. This can result in weak repeating signals detected by multiple detector element pairs as the person sways in and out of the detector element FOVs. It should be noted that, without amplification the object's movement along path 410 may be difficult to detect. However, it should be noted that detection of an object traveling along the path 410 may also be optimized using the techniques described herein.

Figure 5A:
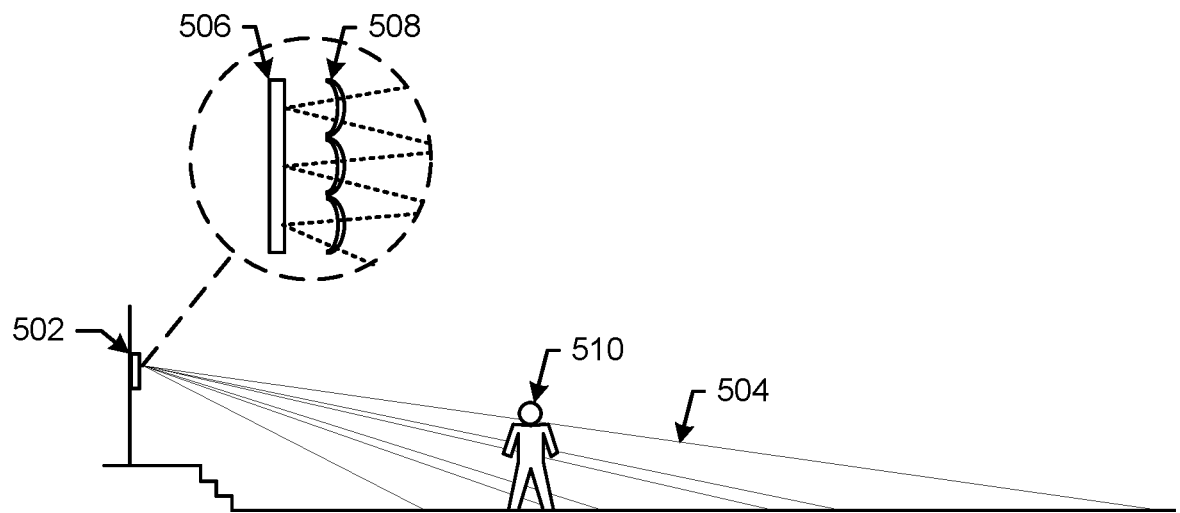
FIG. 5A depicts an example of a cross-section view for a FOV that may be implemented on a motion sensor in accordance with at least some embodiments.

FIG. 5 depicts exemplary embodiments of a PIR detector in combination with an optical array. FIG. 5A depicts an example of a cross-section view for a FOV that may be implemented on a motion sensor in accordance with at least some embodiments. As noted elsewhere, the motion sensor may be included within a security device 502 (e.g., an AV doorbell device) installed on a building, such as at a door of the building. The security device 502 may be positioned to have a motion sensor FOV 504 that covers at least the area in front of, and leading up to, the door.

In order to monitor a large space with only one or two detectors, a typical PIR motion sensor is designed with an optical array (e.g., including optical elements such as lenses or mirrors) on the surface of the sensor.

As noted above, one or more detector elements 506 may be positioned behind an optical array 508 that is configured to focus infrared radiation onto one or more areas of the detector element. As depicted in FIG. 5, the optical array may include multiple lenses arranged vertically such that the detector element is able to monitor a greater volume. Note that embodiments may use multiple lenses or a single lens to achieve this result. The use of multiple lenses in some cases may be advantageous over the use of a single lens in that the FOV area focused onto a particular area of the detector element can be more easily managed.

In embodiments, the optical array 304 is configured to create three vertical tiers of FOV coverage for each detector element in the motion sensor. The multiple tiers enable the motion sensor to detect motion over a longer range.

In the depicted example, an object 510 that is approaching the security device 502 may be detected within multiple portions of the motion sensor FOV 504. Notably, as the object 510 approaches the security device 502, the object 510 will fill up more and more of the motion sensor FOV 504, resulting in generation of a monotonically increasing signal (e.g., a signal that ramps up) as the object continues to approach the security device 502. It should be noted that if the object 510 approaches the security device 502 within a gap (as described in FIG. 4), the object 510 may not be detected until it is close enough that it does not fit within the gap. Such gaps may be reduced or eliminated using interleaved detector elements as described in relation to FIG. 2 above.

Additionally, it should be noted that if the object 510 approaches the security device 502 relatively slowly, the ramp up in signal may be interpreted as noise accumulation and ignored by a conventional motion sensor (e.g., because it does not exceed a detection threshold). Such cases may be avoided by using more accurate noise filtering and by amplifying the generated signal as described herein.

Figure 5B:
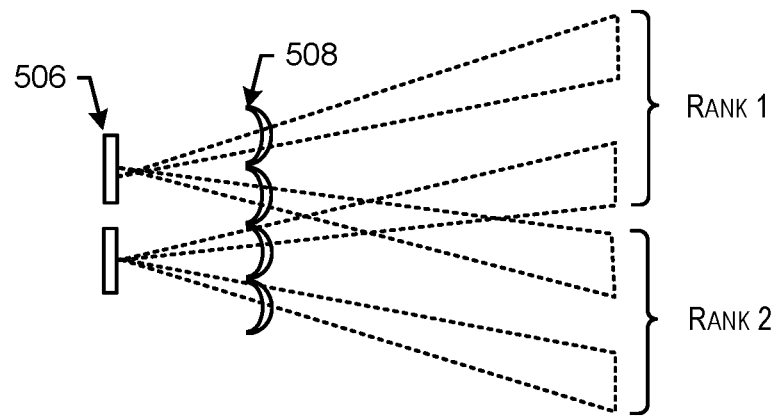
FIG. 5B depicts an example of a top-down view for a FOV that may be implemented on a motion sensor in accordance with at least some embodiments.

FIG. 5B depicts an example of a top-down view for a FOV that may be implemented on a motion sensor in accordance with at least some embodiments. As noted above, one or more detector elements 506 may be positioned behind an optical array 508 that is configured to focus infrared radiation onto one or more areas of the detector element. In addition to being used to generate multiple vertical tiers of FOV, lenses may be arranged horizontally in order to create duplicate horizontal FOVs. For example, multiple lenses in an optical array may be configured to focus radiation from different volumes onto a single detector. In this way multiple "ranks" (e.g., Rank 1 and Rank 2) may be created in a FOV, where each rank represents a set of columns of FOVs for the detector elements 506 in the PIR detector. The multiple ranks enable the motion sensor to detect motion over a wider range.

It should be noted that the optical array 508 may be configured to generate the multiple vertical FOV tiers as depicted in FIG. 5A as well as the multiple horizontal FOV tiers as depicted in FIG. 5B. The resulting motion sensor FOV would be represented by an array of FOVs for individual detector elements as described in greater detail with respect to FIG. 6 below.

Figure 6:
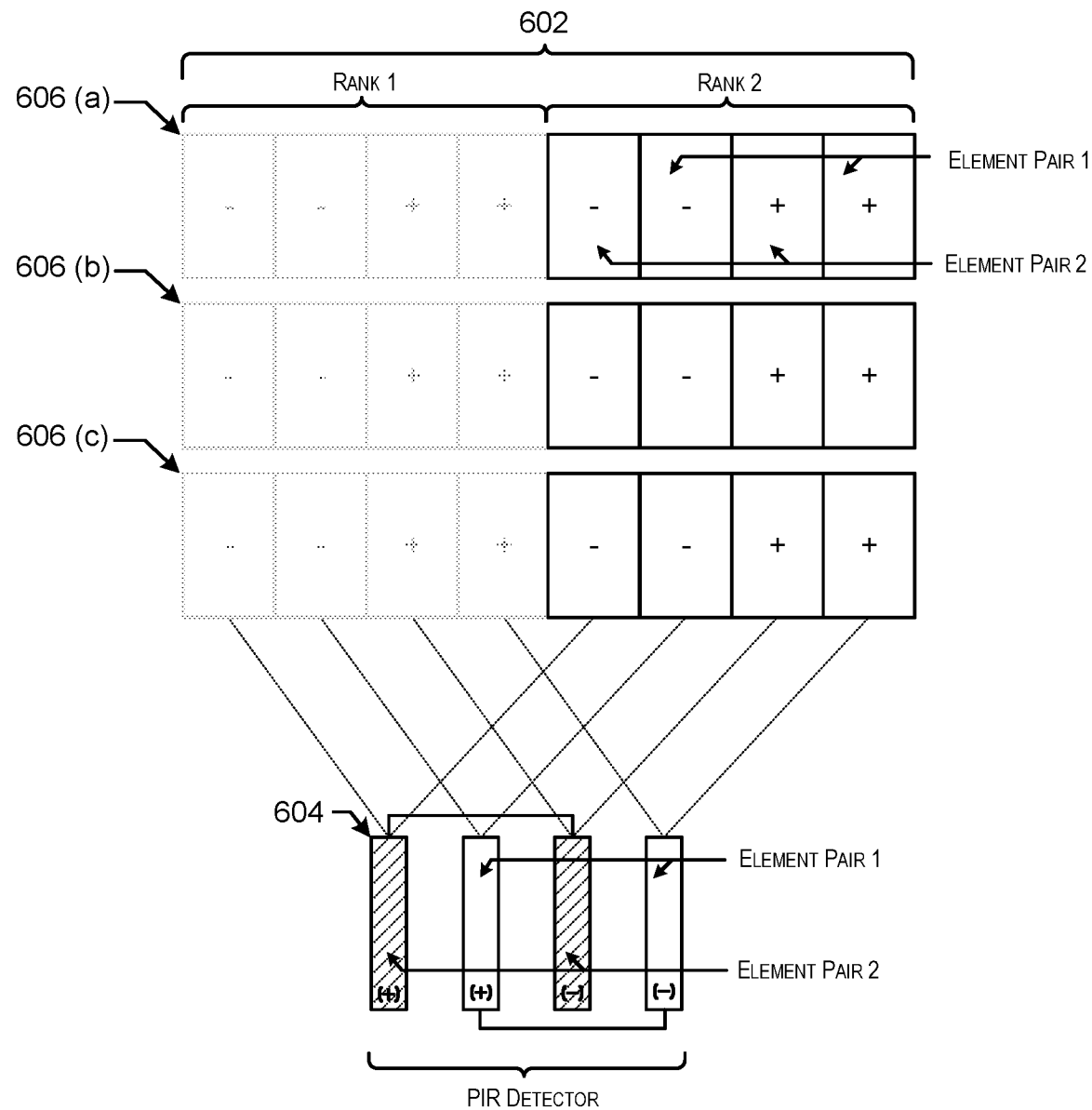
FIG. 6 depicts an example of a FOV associated with a motion sensor that may be implemented in accordance with at least some embodiments.

FIG. 6 depicts an example of a FOV associated with a motion sensor that may be implemented in accordance with at least some embodiments. In this example, the illustrated motion sensor FOV 602 can be achieved by positioning a PIR detector (having two interleaved pairs of detector elements 604 (e.g., element pair 1 and element pair 2)) horizontally. Additionally, an optical array (e.g., optical array 508 as described in relation to FIG. 5) may include a series of vertical and/or horizontal lenses arranged to generate multiple tiers 606(a-c) of vertical coverage and/or multiple ranks of horizontal coverage for the motion sensor FOV 602.

Each of the detector elements 604 may correspond to multiple "columns" in the FOV 602 that represents a FOV of that individual detector element. Accordingly, a polarity of a column in the motion sensor FOV 602 may correspond to a polarity of the respective detector element associated with that column. In the depicted example are two ranks of columns (e.g., Rank 1 and Rank 2) that each include a full set of columns corresponding to each of the detector elements.

In some embodiments, the two pairs of detector elements 604 are arranged such that the two pairs are interleaved as described in relation to FIG. 1 above. As noted elsewhere, the use of interleaved detector elements in this fashion may be used to reduce or eliminate gaps between FOVs of individual detector elements in the motion sensor.

Figure 8:
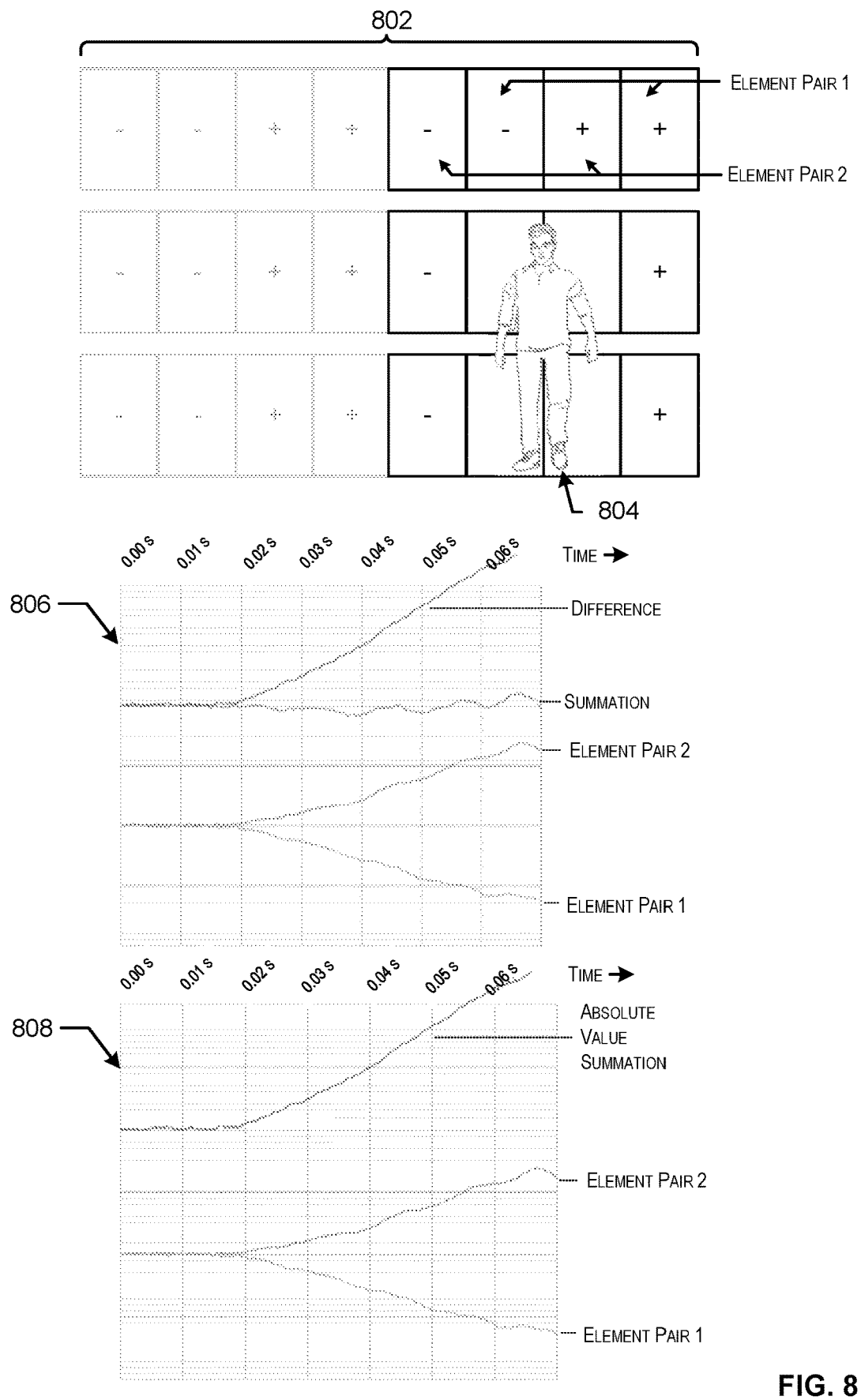
FIG. 8 depicts a second example of signal generation that is used for object detection with and without signal amplification in accordance with embodiments.
Figure 9:
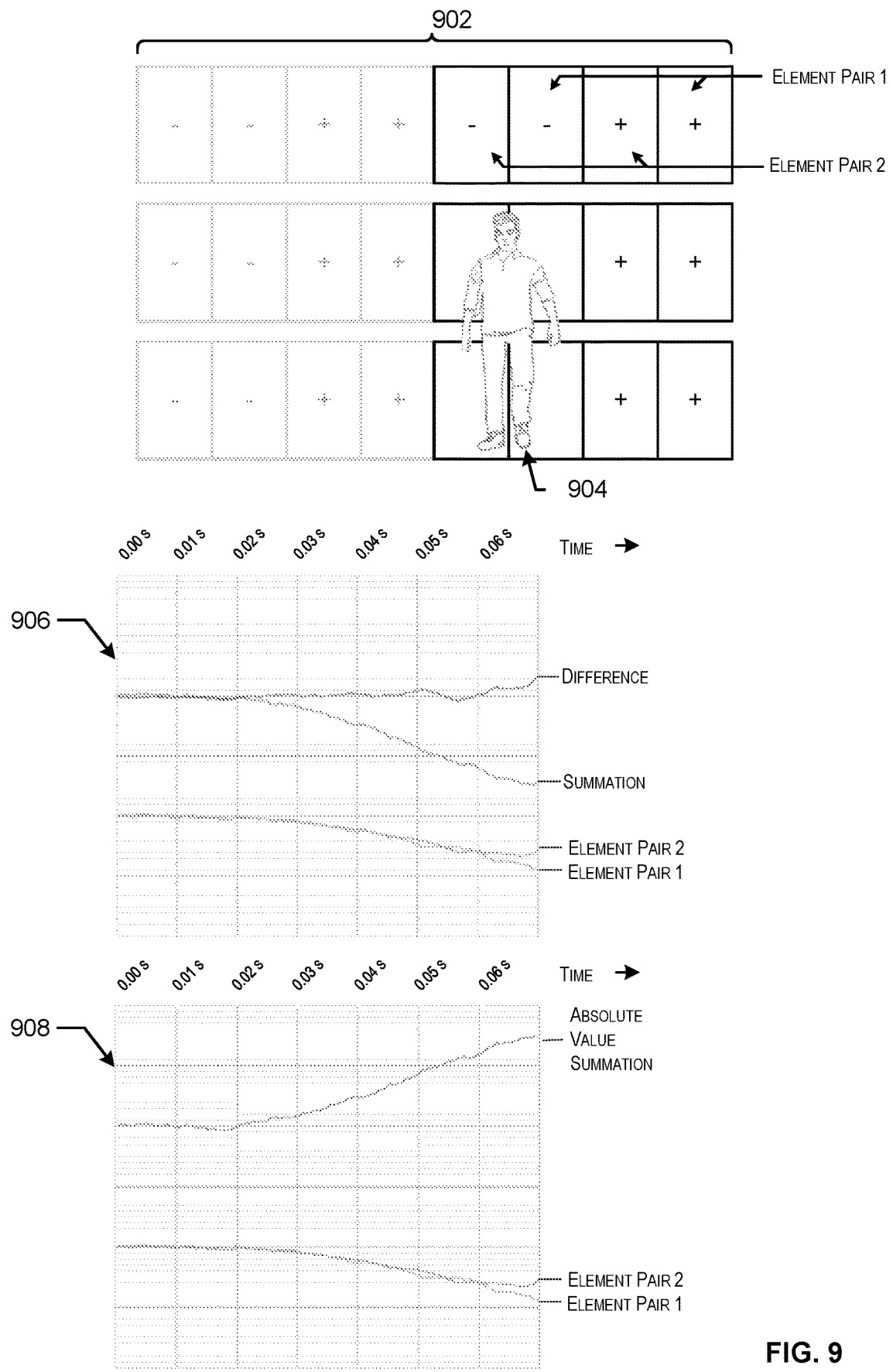
FIG. 9 depicts a third example of signal generation that is used for object detection with and without signal amplification in accordance with embodiments.

Each of FIG. 7-9 below demonstrate a use of the FOV 602 to generate signals that can be used in motion detection. These figures also demonstrate the effect of amplification (e.g., by summation or difference) on the generated signal. Notably, each of the figures demonstrates a separate scenario in which an object is detected by some combination of detector elements. For example, FIG. 7 depicts a scenario in which an object is detected primarily by a single detector element, FIG. 8 depicts a scenario in which an object is detected primarily by two detector elements having opposite polarity, and FIG. 9 depicts a scenario in which an object is detected primarily by two detector elements having the same polarity.

Figure 7:
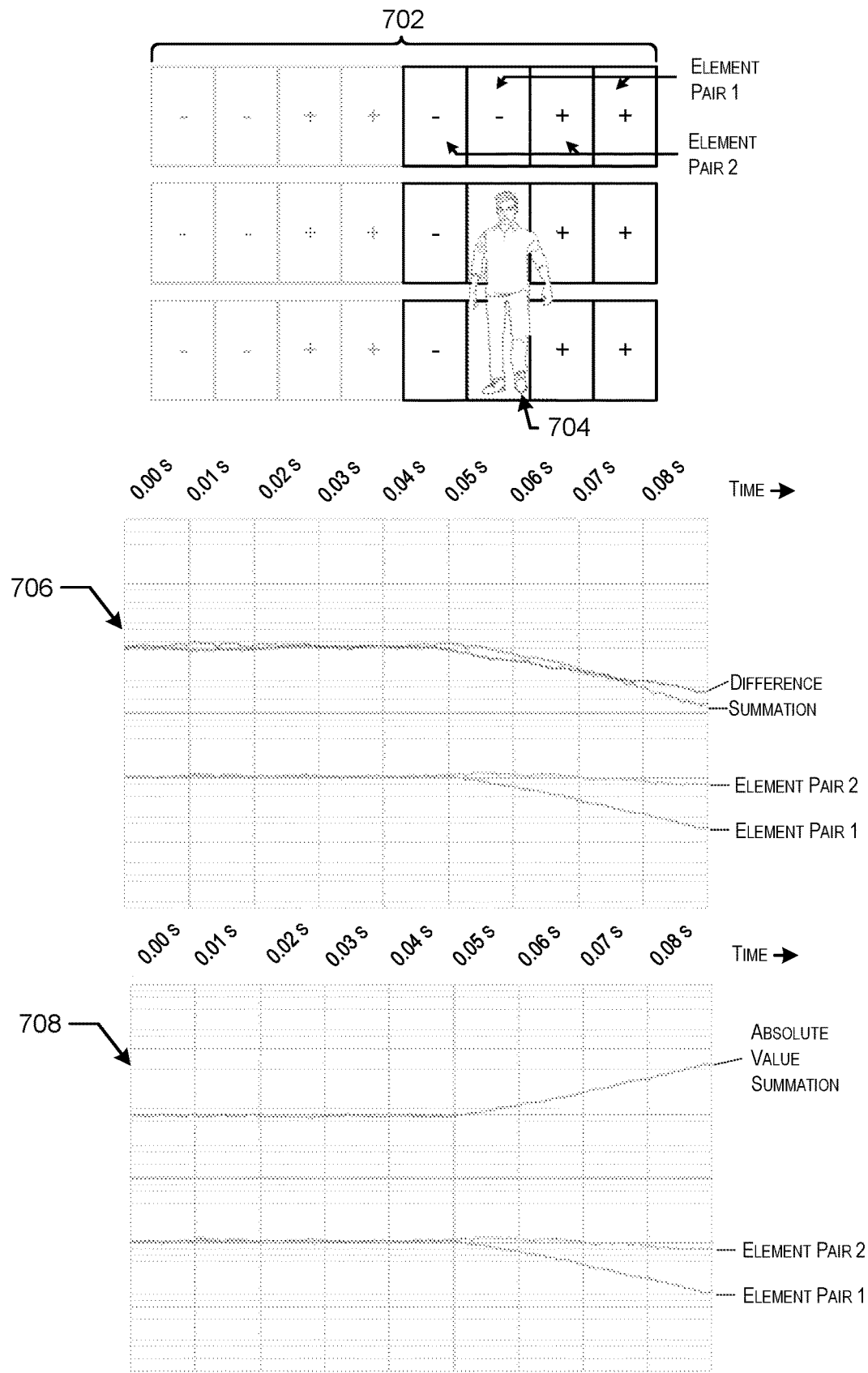
FIG. 7 depicts a first example of signal generation that is used for object detection with and without signal amplification in accordance with embodiments.

FIG. 7 depicts a first example of signal generation that is used for object detection with and without signal amplification in accordance with embodiments. The motion sensor FOV 702 depicted in FIG. 7 is an example of the motion sensor FOV 602 described in relation to FIG. 6 above. In this first example, an object 704 is detected primarily by a single detector element. As noted elsewhere, the motion sensor FOV in this example is generated using two PIR detectors, each of which include two pairs of interleaved elements (e.g., element pair 1 and element pair 2).

As noted elsewhere, the motion sensor may be installed at a location in which an object 704 is likely to approach the motion sensor substantially directly (e.g., near a door of a building). Accordingly, as the object 704 approaches the motion sensor, it will occupy more and more space of the motion sensor FOV 702. In the depicted scenario, the object is growing within a single column associated with a detector element. Note that because each detector element is conductively connected to another detector element, the signal will be associated with a pair of detector elements (e.g., element pair 1) rather than a single detector.

In this first scenario, an object traversing toward a motion sensor within a single column of the motion sensor FOV 702 will generate a signal that is monotonically increasing or decreasing depending on the polarity of the detector element that is detecting the object 704. In such a scenario, the object 704 may, at some point in traversing toward the motion sensor, enter into a second column and may subsequently be detected by a second detector element associated with that second column. In many cases, the object 704 may expand into other vertical tiers of the FOV 702.

As the object 704 continues to approach the motion sensor in the above-noted scenario, a signal may be generated that either increases or decreases (depending on a polarity of the detector element) at a steady rate. As graphically illustrated at 706, since the object 704 is only being detected substantially by a single detector element, a signal may be generated by one of the detector elements pairs (e.g., element pair 1) while no (or very little) signal is generated by the other detector pair (e.g., element pair 2). Note that because only one of the detector element pairs (element pair 1) has generated a signal, amplification of that signal (e.g., by summation or difference) may not be effective since there is insufficient second signal to add to or subtract from that generated signal. Note that the use of subtraction and summation in this manner (e.g., using a differential amplifier and a summing amplifier) might require the use of two detection thresholds (e.g., positive and negative detection thresholds) when making a determination about whether a motion event has been detected.

As graphically illustrated at 708, each of the signals for the element pairs may be made positive and added together in order to obtain an amplified signal that is always positive. Note that in this scenario, the signal is only slightly more exaggerated than the original signals themselves due to only one of the signals having significant amplitude. Note that the use of an absolute value summation in this manner would only require the use of a single detection threshold when making a determination about whether a motion event has been detected.

FIG. 8 depicts a second example of signal generation that is used for object detection with and without signal amplification in accordance with embodiments. The motion sensor FOV 802 depicted in FIG. 8 is an example of the motion sensor FOV 602 described in relation to FIG. 6 above. In this second example, an object 804 is detected primarily by two detector elements having opposite polarity.

In the depicted scenario, as the object 804 approaches the motion sensor, it will occupy more and more space of the motion sensor FOV 802. Notably, the object is growing within two different columns of the FOV 802, each of which is associated with a detector element of a different detector element pair. Note additionally in this example that the detector elements that are detecting the object 804 have opposite polarity.

As the object 804 continues to approach the motion sensor in the above-noted scenario, a first signal may be generated by the first detector element pair (e.g., element pair 2) that increases at a steady rate whereas a second signal may be generated by the second detector element pair (e.g., element pair 1) that decreases at the same rate (because of the opposite polarities).

As graphically illustrated at 806, given that the object 804 is detected equally by each of the two detector elements (e.g., the object 804 is halfway between the two FOV columns), the signals from each of the element pairs would largely cancel each other out when added in the summation. However, when one of the signals is subtracted from the other, as achieved in the difference amplification, the signal is amplified greatly, making the object 804 much easier to detect. Accordingly, it would be recognized by one skilled in the art that using a difference amplification would have a significant effect on motion detection for objects detected by two detector elements having opposite polarity.

As graphically illustrated at 808, each of the signals for the element pairs may be made positive and added together in order to obtain an amplified signal that is always positive. Note that in this scenario, the absolute value summation generates a signal that is equal to that generated using the differential amplification as noted above. Accordingly, absolute value summation would also have a significant effect on motion detection for objects detected by two detector elements having opposite polarity.

FIG. 9 depicts a third example of signal generation that is used for object detection with and without signal amplification in accordance with embodiments. The motion sensor FOV 902 depicted in FIG. 9 is an example of the motion sensor FOV 602 described in relation to FIG. 6 above. In this third example, an object 904 is detected primarily by two detector elements having the same polarity.

In the depicted scenario, as the object 904 approaches the motion sensor, it will occupy more and more space of the motion sensor FOV 902. Notably, the object is growing within two different columns of the FOV 902, each of which is associated with a detector element of a different detector element pair. Note additionally in this example that the detector elements that are detecting the object 904 have the same polarity.

As the object 904 continues to approach the motion sensor in the above-noted scenario, a first signal and second signal may each be generated by the first detector element pair (e.g., element pair 1) and the second detector element pair (e.g., element pair 2) that both either increase or decrease at a steady rate (because they have the same polarity).

As graphically illustrated at 906, given that the object 904 is detected equally by each of the two detector elements (e.g., the object 904 is halfway between the two FOV columns), these signals would be roughly equal to each other. An amplified signal would have double the amplitude of either individual signal when added in the summation, making the object 904 much easier to detect. However, when one of the signals is subtracted from the other, as achieved in the difference amplification, the signal is largely canceled, making that sort of amplification ineffective for this scenario. Accordingly, it would be recognized by one skilled in the art that using a summation would have a significant effect on motion detection for objects detected by two detector elements having the same polarity.

As graphically illustrated at 908, each of the signals for the element pairs may be made positive and added together in order to obtain an amplified signal that is always positive. Note that in this scenario, the absolute value summation generates a signal that is opposite to that generated using the summation as noted above. Accordingly, absolute value summation would also have a significant effect on motion detection for objects detected by two detector elements having the same polarity.

Figure 10:
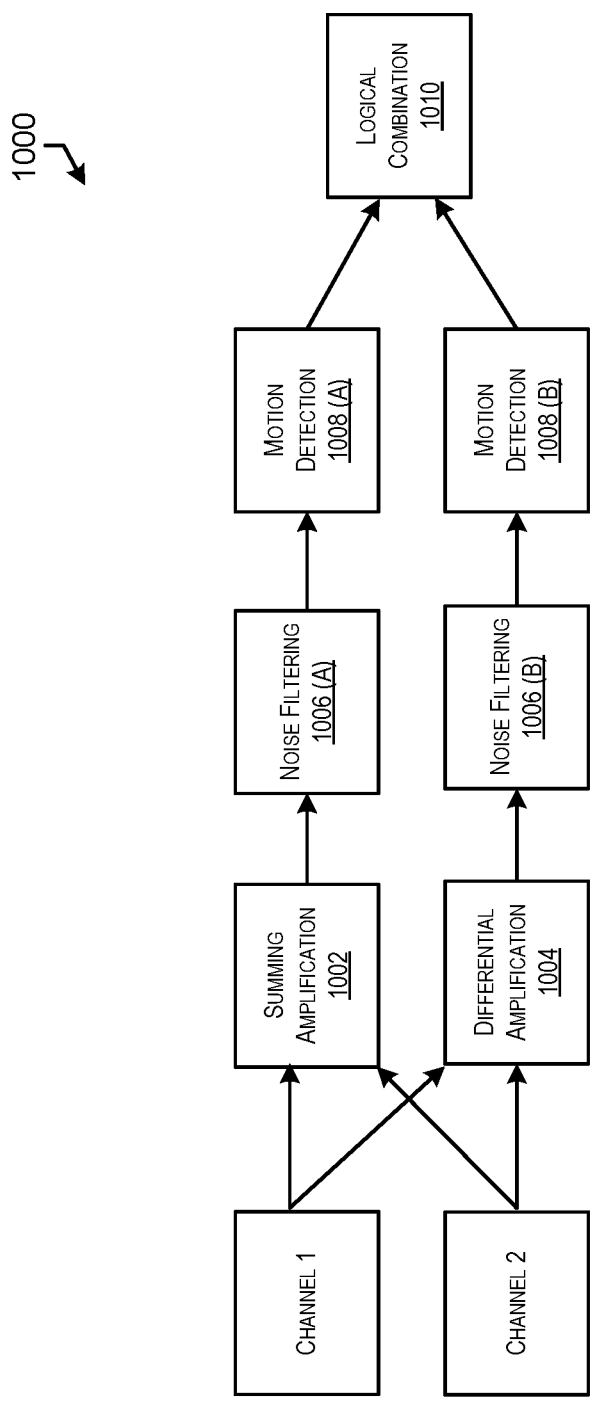
FIG. 10 depicts a first block diagram illustrating an example process for performing motion detection using a PIR detector in accordance with embodiments.

FIG. 10 depicts a first block diagram illustrating an example process for performing motion detection using a PIR detector in accordance with embodiments. The process 1000 may be performed using any combination of analog or digital signal processing components. Examples of hardware components that may be used to perform the process 1000 are described in greater detail with respect to FIG. 12 and FIG. 13 below.

As noted elsewhere, an exemplary PIR detector may include two connected pairs of detector elements that are interleaved in a manner that reduces gaps between individual FOVs of those detector elements. The process 1000 is described in relation to such an exemplary PIR detector. In the process 1000, a first of the two pairs of connected detector elements are associated with a first channel (Channel 1) and a second of the two pairs of connected detector elements are associated with a second channel (Channel 2).

The process 1000 is described in relation to two subprocesses that are performed in parallel. More particularly, the two subprocesses relate to processing signals using summation and processing signals using subtraction. Both subprocesses may be performed in real time (or near real time) as signals are generated by one or both of channel 1 and channel 2. The individual steps in the process 1000 may be performed using analog or digital techniques.

In the first subprocess, signals received from both channels are subjected to a summation at 1002. This may involve adding the two signals together to obtain an output signal that represents the sum of the two signals. In some cases, the summation is performed using one or more analog circuits, such as a summing amplifier. In these cases, the signals generated by each of the channels is provided as input to the summing amplifier in order to generate the output signal. In other cases, the analog signal generated by each of the channels 1 and 2 are each converted into a digital value and those numeric values are numerically added.

In the second subprocess, signals received from both channels are subjected to subtraction at 1004. This may involve subtracting one of the two signals from the other in order to obtain an output signal that represents the difference of the two signals. In some cases, the subtraction is performed using one or more analog circuits, such as a differential amplifier. In these cases, the signals generated by each of the channels is provided as input to the differential amplifier in order to generate the output signal.

At 1006 (A and B), data generated based on the signal may be subjected to one or more noise filtering techniques. In embodiments, noise may be detected in a signal if a current data value exceeds a first threshold, and a slope (e.g., rate of change) for the signal over some period of time (or an absolute value for the slope) does not exceed a threshold slope value. Upon determining that (given that a value associated with the signal is non-zero) the slope does not exceed (or is less than or equal to) the threshold slope value, a reference value may be set to reset or rezero the signal or data generated based on the signal or used for comparison or calculation of adjusted values.

At 1008 (A and B), the signal may be subjected to one or more motion detection techniques. This may involve comparing a data value generated for the signal (or an absolute value associated with such a value) to at least one detection threshold. If the value (or absolute value) is greater than (or greater than or equal to) a detection threshold, then an indication is generated that a motion detection event has occurred. Otherwise, if the value (or absolute value) is less than (or less than or equal to) the detection threshold, then the process will continue to be repeated. In some cases, indication that a motion detection event has occurred may be a binary output. For example, the subprocess may output a "zero" as long as no motion detection event is occurring and a "one" while the motion detection event is occurring.

In some cases, the process 1000 may use two different detection thresholds, one that is positive and one that is negative. In such cases, a motion detection event may be detected if either of the detection thresholds is breached. For example, if a determined value is greater than a positive detection threshold, or less than a negative detection threshold, then a motion detection event may be identified.

At 1010, the results of the two subprocesses may be combined to determine if a motion detection event has occurred. In some embodiments, this may involve using a logic gate, such as an "OR" gate, to determine if either of the subprocesses has resulted in a motion detection event. If either of the subprocesses has resulted in a motion detection event, a motion detection notification may be transmitted to at least one second electronic component.

Figure 11:
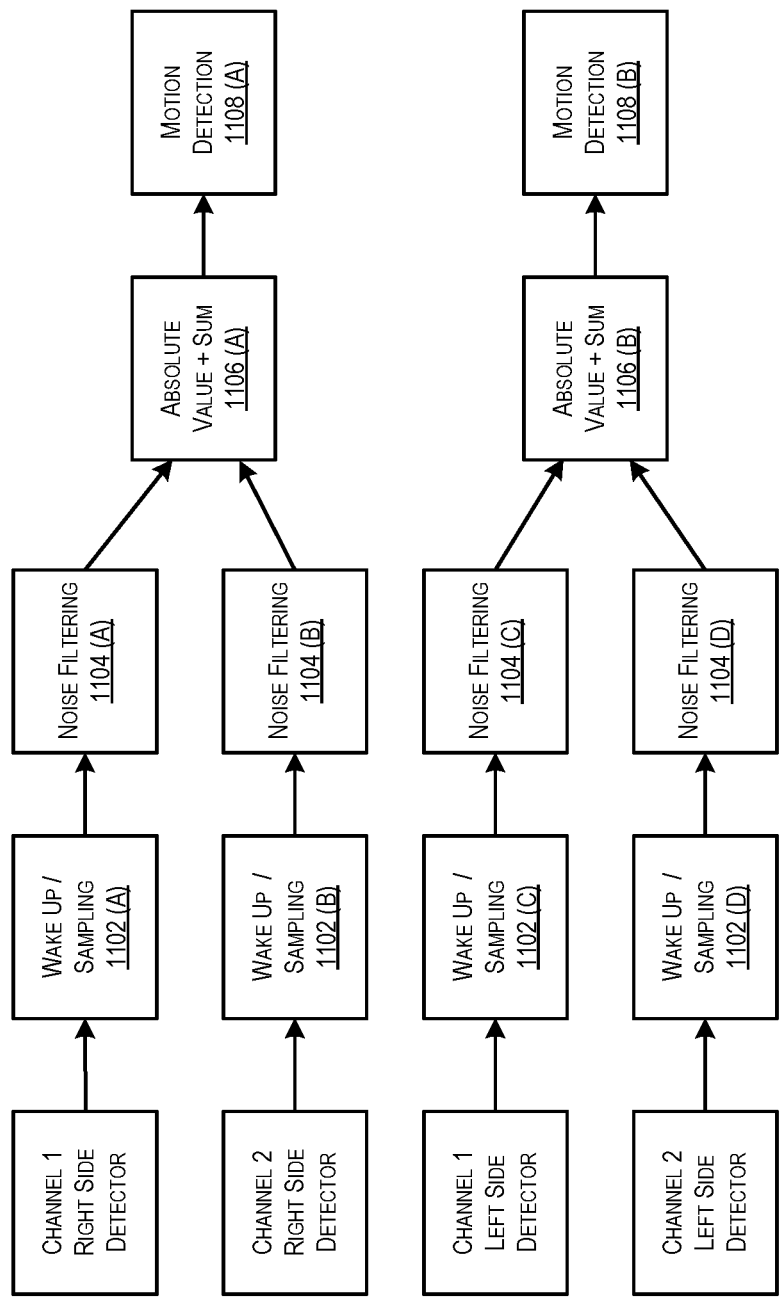
FIG. 11 depicts a second block diagram illustrating an example process for performing motion detection using a PIR detector in accordance with embodiments.

FIG. 11 depicts a second block diagram illustrating an example process for performing motion detection using a PIR detector in accordance with embodiments. The process 1100 may be performed using any combination of analog or digital signal processing components. Examples of hardware components that may be used to perform the process 1100 are described in greater detail with respect to FIG. 12 and FIG. 13 below.

At 1102(A-D), one or more detector elements may generate a signal that represents a potential motion. A circuit monitoring the detector element may be configured to wake up at intervals and sample the signal (e.g., voltage) as generated by the detector element. The signal generated by the detector element may be sampled at periodic intervals in order to generate a motion signal.

At 1104(A-D), one or more noise filtering techniques may be performed on the signal. This may involve determining if a slope associated with a predetermined period of time exceeds a threshold slope value. If the slope (or an absolute value of the slope) exceeds the threshold slope value within the period of time, then the signal may represent a potential motion detection event. However, if the slope does not exceed the threshold slope value within the period of time, then the signal may be determined to represent noise (e.g., noise accumulation). Accordingly, the noise filtering at 1104 may involve zeroing out such noise using an offset or reference value. It should be noted that the slope may be monitored so that if it exceeds the threshold slope value at any point, the signal is not zeroed.

At 1106, signals from the various detector elements may be added. In some cases, the signal generated for two channels may be summed. Additionally, the process 1100 may further involve determining an absolute value for the respective signals and summing all of those absolute values into a single value.

Upon generating a value that represents an absolute value summation of the signals generated by the detector elements, a motion detection event may be determined based on that value at 1108. In embodiments, this may involve determining if the value exceeds a detection threshold. In some cases, the determination may be made based on whether determined values exceed the detection threshold for at least a predetermined number of consecutive values or amount of time.

Figure 12:
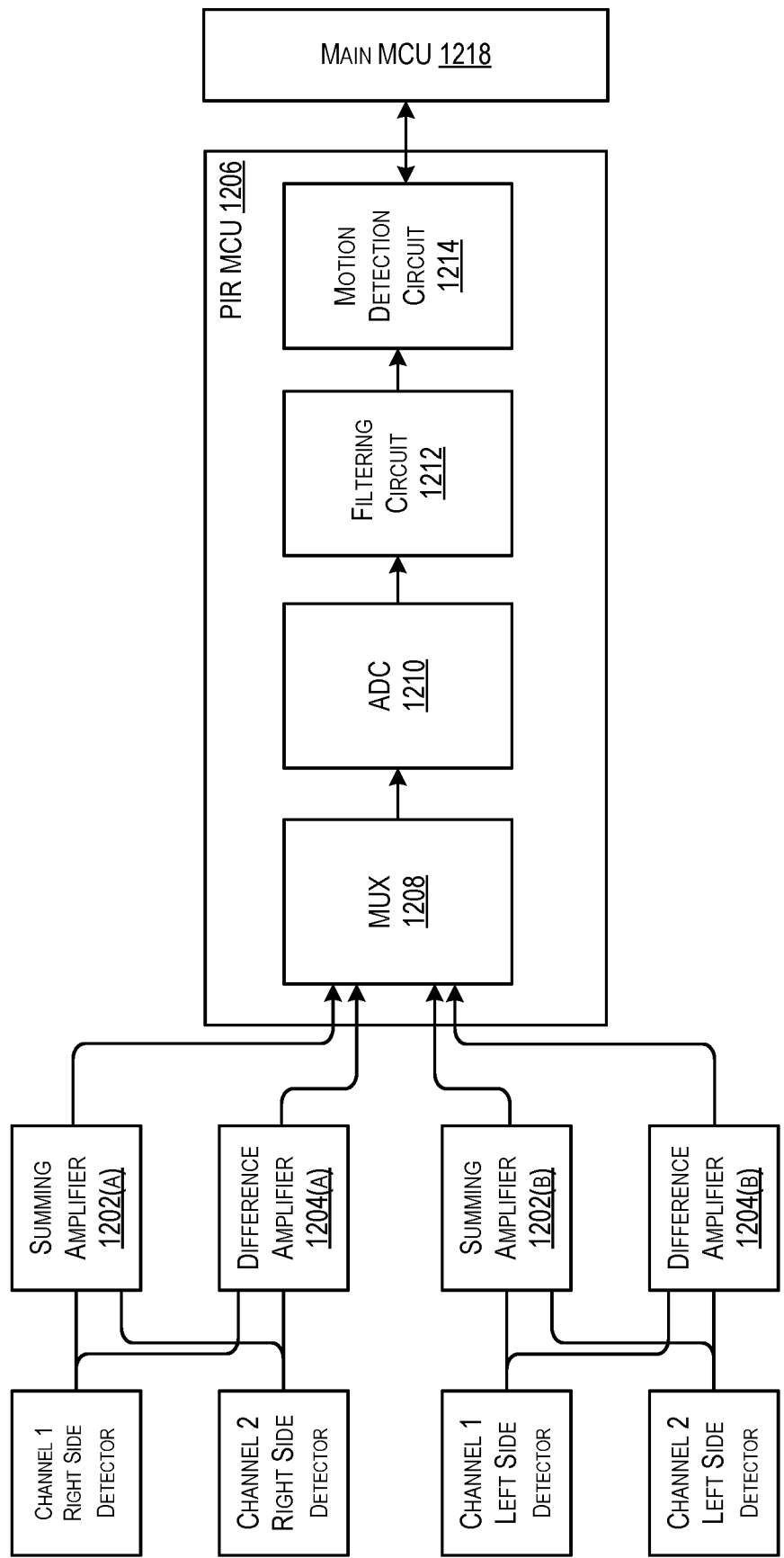
FIG. 12 depicts a first example of components that may be included in a motion detection system for achieving the described techniques in accordance with embodiments.

FIG. 12 depicts a first example of components that may be included in a motion detection system for achieving the described techniques in accordance with embodiments. More particularly, FIG. 12 depicts an example utilizing analog signal processing components, specifically summing amplifiers and differential amplifiers.

The depicted example is illustrated as receiving signals from two separate PIR detectors (a right-side PIR Detector and a left side PIR Detector) that may be horizontally aligned. In embodiments, these two PIR detectors may correspond to the PIR Detector 1 and PIR Detector 2 used to generate a motion sensor FOV such as illustrated in FIG. 5B. Additionally, the depicted example is illustrated as receiving signals from two different channels for each of the respective PIR Detectors (Channel 1 and Channel 2). As noted elsewhere, each "channel" may represent a connected pair of detector elements having opposite polarity. Accordingly, Channel 1 and Channel 2 may correspond to separate pairs of connected detector elements within the PIR detector as noted in relation to FIG. 10 above.

As illustrated, each of the channels for the PIR detectors may be connected to amplifier components 1202 and 1204 (A and B respectively for the different PIR detectors). In an exemplary embodiment, the amplifier component may be an operational amplifier.

The amplifier components may include a summing amplifier 1202(A-B) and a difference amplifier 1204(A-B). In a summing amplifier circuit, the output voltage, ($V_{out}$) is proportional to the sum of the input voltages (signals), such as $V_1$ received as input from Channel 1 and $V_2$ received as input from Channel 2 of one of the PIR detectors.

A difference amplifier (aka a differential amplifier) 1204 may use a combination of both inverting and non-inverting amplifiers that use a negative feedback connection to control the differential voltage gain. In a difference amplifier 1204 (A-B), the output voltage, ($V_{out}$) is proportional to the difference of the input voltages (signals), such as $V_1$ received as input from Channel 1 and $V_2$ received as input from Channel 2 of one of the PIR detectors.

The resulting signal from each of the amplifiers may be provided to a microcontroller unit (MCU) 1206 for the PIR. The MCU is an integrated circuit (IC) component that comprises a processor unit, and memory modules. The MCU 1206 may be capable of executing program instructions stored in its non-volatile memory module to perform at least a portion of the functions described herein.

In some embodiments, each of the amplifiers 1202 and 1204 may implement an input offset that is capable of being used to reset or zero out a signal generated by that amplifier.

The signals received at the PIR MCU 1206 may be received via a multiplexer (MUX) 1208.

In some embodiments, the PIR MCU may convert analog signals to digital data. The PIR MCU may include an Analog to Digital Converter 1210.

In exemplary embodiments, the MCU 1206 may include software and/or an integrated circuit configured to filter noise from a signal. As noted elsewhere, one potential issue with the use of PIR detectors in motion detection is that drift or noise can accumulate in a signal generated by the PIR detector. In systems that use a detection threshold for detecting motion, such an accumulation might cause an amplitude of a generated signal to exceed that detection threshold when it would not have exceeded the detection threshold absent the accumulation. Accordingly, when used in motion detection, this accumulation can cause false positives to occur. To prevent such false positives, the MCU 1206 may include a filtering circuit and/or filtering software module 1212.

In embodiments, filtering hardware or software is configured to determine a slope (e.g., rate of change) associated with a portion of a signal as generated by each of the amplifiers. In accordance with one or more preferred implementations, slope calculation occurs after it is determined that a current value of a signal generated using an ADC exceeds a first threshold. In some cases, the slope may be a median average slope value for the signal over a predetermined preceding period of time. In some cases, the slope may be calculated from a first value for the signal at a first time $T_1$ and a second value for the signal at a second time $T_2$. For example, a slope may be estimated for the signal as the difference between the first and second value divided by the difference in time between time $T_1$ and time $T_2$.

Once a slope for the signal has been determined, that slope (or an absolute value for that slope) is then compared against a threshold slope value to determine if the signal relates to a potential motion or to noise. If the slope (or absolute value) is greater than the threshold slope value, then a determination may be made that the signal relates to a potential motion detection event. motion detection module.

If, however, the calculated slope does not exceed the threshold slope value, then a determination may be made that the signal likely relates to noise. In this scenario, the filtering module 1212 may be configured to reset or zero out the signal in order to purge any accumulated noise. To do this, the filtering circuit may determine an average value for the signal over a preceding predetermined amount of time and may adjust the signal based on that average value. The signal may be reset or zeroed out using techniques for either analog or digital signal adjustment.

In an example of a signal zeroing technique using analog signal adjustment, the filtering module 1212 may provide an offset signal to one or more of the amplifiers 1202(A-B) or 1204(A-B) based on that average value. The offset signal may indicate a voltage by which the signals generated by a PIR detector should be adjusted such that the average value of the signal received at the filtering module 1212 averages out to zero. In some cases, the filtering module may maintain a rolling offset value that represents a total voltage offset to be applied to a particular amplifier. In these cases, upon the filtering module 1212 detecting noise in the signal, the filtering module 1212 may adjust the rolling offset value based on the determined average value for the signal. A rolling offset value maintained by the filtering module 1212 may be provided to a respective amplifier as an offset signal on a constant (or semi constant) basis.

In an example of a signal zeroing technique using digital signal adjustment, the filtering module 1212 may simply adjust (e.g., lower or raise) a value determined based on the signal, e.g., so that it is averaged out at zero for some period of time. In some cases, this may involve determining an average value of the signal over the period of time and subtracting that average value for each point in the signal over that period of time.

Once noise has been filtered from the signal, that signal is relayed to a motion detection module 1214. The motion detection module 1214 may be configured to detect a motion detection event based on the received signal. In some embodiments, a motion detection event is detected upon determining that a value for the signal has exceeded a detection threshold. It should be noted that a sensitivity of the motion sensor that includes the MCU 1206 may be adjusted by adjusting the detection threshold, such that a lower detection threshold would result in higher sensitivity to motion while also introducing a greater risk of false positives. However, it should further be noted that the introduction of the improved noise filtering (e.g., by the filtering module 1212) can significantly reduce the risk of false positives. Accordingly, by implementing the filtering module 1212 along with the motion detection module 1214, the detection threshold can be lowered, making the motion sensor more sensitive to motion that otherwise would not be easily detectable (e.g., such as motion by an object walking toward the motion sensor) without the typical drawbacks of lowering the detection threshold (e.g., an increased risk of false positives).

The motion detection module 1214 is configured to generate a motion detection notification each time that a value of the signal exceeds the detection threshold. Upon such a motion detection notification being generated, it is relayed to at least one second electronic component. In the depicted example, the motion detection notification is relayed to a main MCU 1218 which may represent a MCU for a device in which the PIR detector is installed.

Figure 13:
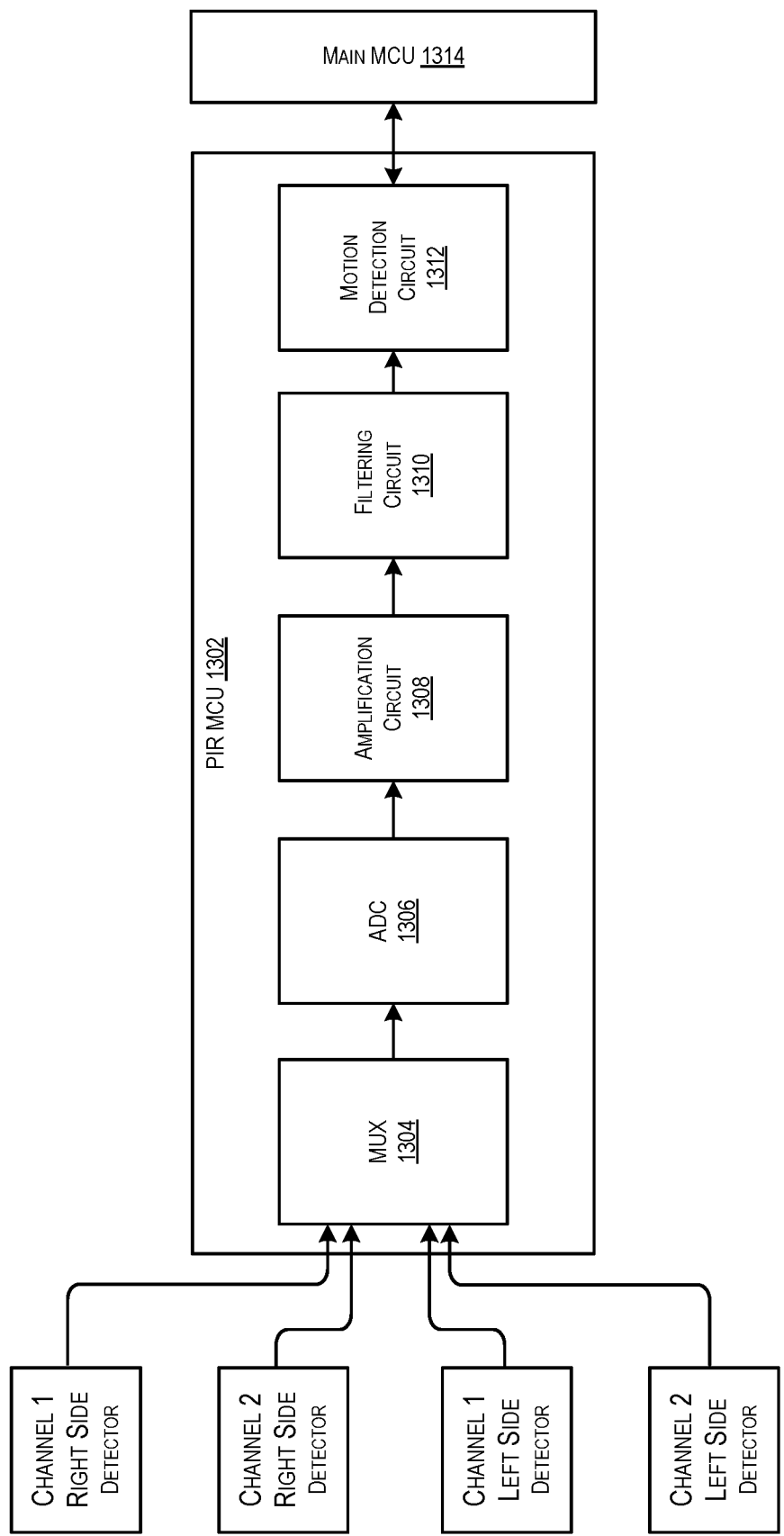
FIG. 13 depicts a second example of components that may be included in a motion detection system for achieving the described techniques in accordance with embodiments.

FIG. 13 depicts a second example of components that may be included in a motion detection system for achieving the described techniques in accordance with embodiments. More particularly, FIG. 13 depicts an example of hardware components on which the majority of the signal processing may be performed using digital signal processing components.

Similar to the first example described in relation to FIG. 11 above, the depicted second example is illustrated as receiving signals from two separate PIR detectors (a left PIR detector and a right PIR detector) that may be horizontally aligned. The depicted example is illustrated as receiving signals from two different channels at each of the respective PIR detectors (Channel 1 and Channel 2).

The system may include a multiplexer (MUX) 1304. The MUX 1304 may provide an analog output signal to an ADC 1306 to be converted into a digital signal.

Like the first example described in relation to FIG. 12 above, the signals of the second example may be subjected to both summation and subtraction. However, because the signals have been converted to digital signals, such operations may also take place digitally at a software module configured to perform such amplification (e.g., amplification module 1308).

Similar to the first example described in FIG. 12, the filtering module 1310 is configured to effect recentering or rezeroing based on a determined slope associated with a portion of each of the signals as generated by the amplification module 1308.

Motion detection module 1312 may be configured to detect a motion detection event.

The motion detection module 1312 is configured to generate a motion detection notification each time that a value of the signal exceeds the detection threshold. Upon such a motion detection notification being generated, it is relayed to at least one second electronic component. In the depicted example, the motion detection notification is relayed to a main MCU 1214 which may represent a MCU for a device in which the PIR detector is installed.

Figure 14:
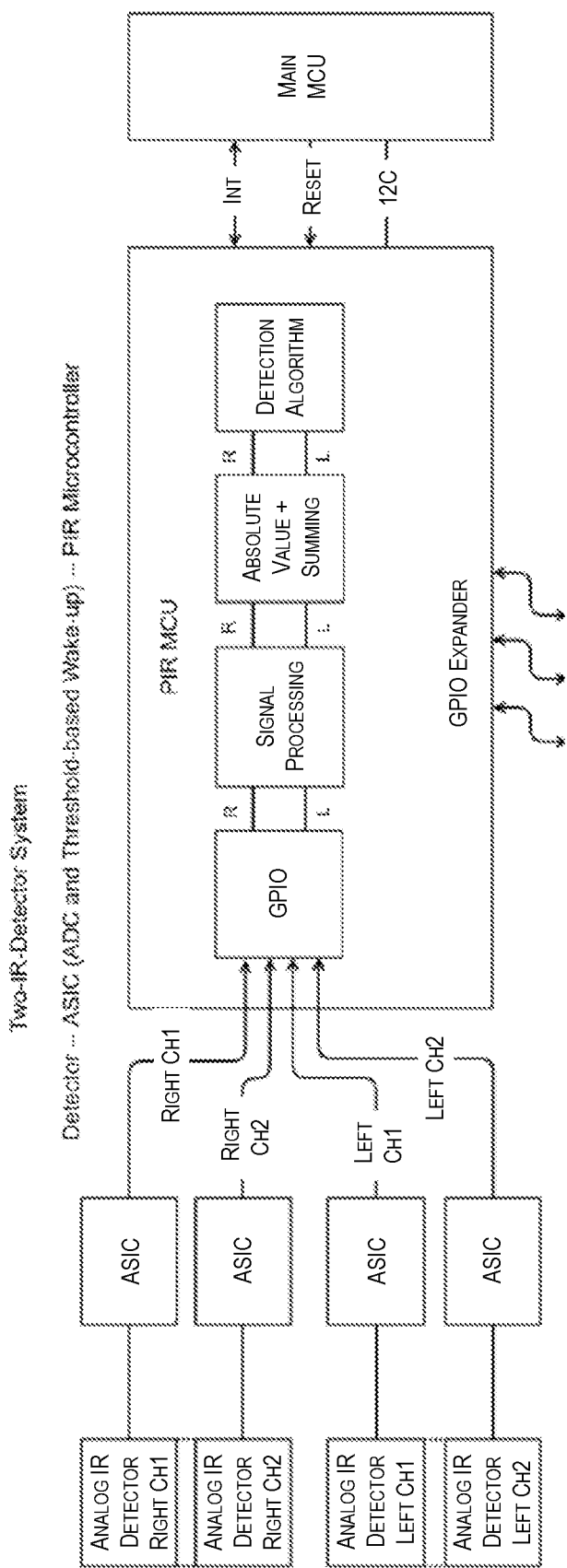
FIG. 14 illustrates another exemplary architecture in accordance with one or more preferred implementations, where an integrated circuit component is utilized for each channel of each of two detectors.

FIG. 14 illustrates another exemplary architecture in accordance with one or more preferred implementations, where an integrated circuit component is utilized for each channel of each of two detectors. Digital data generated by the integrated circuit components based on input signals from the channels is communicated to a microcontroller of a PIR detector, e.g., for processing as described herein.

In accordance with one or more implementations, these integrated circuit components, or a microcontroller, is or are configured to perform peak detection on data representing a signal, e.g., a peak could be detected based on determining that a change over time has switched signs or based on determining that a determined difference between a highest (or lowest) saved value and a current value exceeds a threshold. In accordance with one or more implementations, data for detected peaks is utilized for processing as described herein, while in accordance with one or more preferred implementations, all sampled values for a signal are utilized for processing as described herein. In accordance with one or more implementations, an integrated circuit component looks for a configured number of peaks above a threshold value, and then begins polling at a higher rate and sending all sampled values to a microcontroller for processing.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. An electronic device comprising:
   a camera;
   first, second, third, and fourth pyroelectric sensing elements, wherein the second pyroelectric sensing element is disposed between the first pyroelectric sensing element and the third pyroelectric sensing element, and wherein the third pyroelectric sensing element is disposed between the second pyroelectric sensing element and the fourth pyroelectric sensing element;
   a first integrated circuit component electrically coupled to the first pyroelectric sensing element and the third pyroelectric sensing element;
   a second integrated circuit component electrically coupled to the second pyroelectric sensing element and the fourth pyroelectric sensing element;
   one or more processors, and
   one or more computer readable media storing processor executable instructions which, when executed using the one or more processors, cause the electronic device to perform operations comprising
      determining a first absolute value based on first data received from the first integrated circuit component,
      determining a second absolute value based on second data received from the second integrated circuit component,
      determining a first sum value based on the first absolute value and the second absolute value,
      comparing the first sum value to a first threshold,
      determining a first difference value based on a first value based on the first data and a second value based on the second data,
      comparing the first difference value to a second threshold, and
      based on the comparing of the first sum value to the first threshold and the first difference to the second threshold, generating, using the camera, image data.

2. The electronic device of claim 1, wherein the electronic device further comprises a wireless communication component, and wherein the one or more computer readable media store processor executable instructions which, when executed using the one or more processors, cause the electronic device to perform operations comprising
   based on the comparing of the first sum value to the first threshold, sending an alert to a remote system.

3. The electronic device of claim 1, wherein the electronic device comprises a microcontroller, and wherein the one or more computer readable media include one or more computer readable media of the microcontroller.

4. An electronic device comprising:
a wireless communication component;
first, second, third, and fourth pyroelectric sensing elements, wherein the second pyroelectric sensing element is disposed between the first pyroelectric sensing element and the third pyroelectric sensing element, and wherein the third pyroelectric sensing element is disposed between the second pyroelectric sensing element and the fourth pyroelectric sensing element;
one or more processors, and
one or more computer readable media storing processor executable instructions which, when executed using the one or more processors, cause the electronic device to perform operations comprising
receiving first data generated based on the first pyroelectric sensing element and the third pyroelectric sensing element,
receiving second data generated based on the second pyroelectric sensing element and the fourth pyroelectric sensing element,
determining a first absolute value based on the first data,
determining a second absolute value based on the second data,
determining a first sum value based on the first absolute value and the second absolute value,
comparing the first sum value to a first threshold,
determining a first difference value based on a first value based on the first data and a second value based on the second data,
comparing the first difference value to a second threshold, and
based on the comparing of the first sum value to the first threshold and the first difference value to the second threshold, sending, using the wireless communication component, third data.

5. The electronic device of claim 4, wherein the electronic device comprises
fifth, sixth, seventh, and eighth pyroelectric sensing elements, wherein the sixth pyroelectric sensing element is disposed between the fifth pyroelectric sensing element and the seventh pyroelectric sensing element, and wherein the seventh pyroelectric sensing element is disposed between the sixth pyroelectric sensing element and the eighth pyroelectric sensing element.

6. The electronic device of claim 4, wherein the electronic device comprises a first integrated circuit component coupled to the first and third pyroelectric sensing elements, and a second integrated circuit component coupled to the second and fourth pyroelectric sensing elements.

7. The electronic device of claim 4, wherein the electronic device comprises a first integrated circuit component coupled to
the first and third pyroelectric sensing elements by a first line, and
the second and fourth pyroelectric sensing elements by a second line.

8. The electronic device of claim 4, wherein the electronic device comprises
a first integrated circuit component coupled to the first and third pyroelectric sensing elements, the first integrated circuit component comprising a first analog to digital converter,
a second integrated circuit component coupled to the second and fourth pyroelectric sensing elements, the second integrated circuit component comprising a second analog to digital converter,
a controller coupled to the first integrated circuit component and the second integrated circuit component,
wherein the controller comprises the one or more computer readable media.

9. The electronic device of claim 4, wherein the third data comprises an indication of a motion detection event.

10. The electronic device of claim 4, wherein the electronic device comprises a camera, and wherein the one or more computer readable media store processor executable instructions which, when executed using the one or more processors, cause the electronic device to perform operations comprising
based on the comparing of the first sum value to the first threshold, generating image data using the camera.

11. The electronic device of claim 4, wherein the electronic device comprises a camera, and wherein the one or more computer readable media store processor executable instructions which, when executed using the one or more processors, cause the electronic device to perform operations comprising
based on the comparing of the first sum value to the first threshold, powering on the camera.

12. The electronic device of claim 4, wherein the electronic device comprises a camera, and wherein the one or more computer readable media store processor executable instructions which, when executed using the one or more processors, cause the electronic device to perform operations comprising
based on the comparing of the first sum value to the first threshold, modifying a configuration setting of the camera.

13. The electronic device of claim 4, wherein the electronic device comprises a camera, and wherein the one or more computer readable media store processor executable instructions which, when executed using the one or more processors, cause the electronic device to perform operations comprising
based on the comparing of the first sum value to the first threshold, providing power to the wireless communication component.

14. An electronic device comprising:
a wireless communication component;
first, second, third, and fourth pyroelectric sensing elements, wherein the second pyroelectric sensing element is disposed between the first pyroelectric sensing element and the third pyroelectric sensing element, and wherein the third pyroelectric sensing element is disposed between the second pyroelectric sensing element and the fourth pyroelectric sensing element;
one or more processors, and
one or more computer readable media storing processor executable instructions which, when executed using the one or more processors, cause the electronic device to perform operations comprising
receiving, from an integrated circuit component, first data generated at a first time based on the first pyroelectric sensing element and the third pyroelectric sensing element,
receiving, from an integrated circuit component, second data generated at a second time based on the first pyroelectric sensing element and the third pyroelectric sensing element, the second time being after the first time, determining a slope value based on the first data and the second data, comparing the slope value to a first threshold, based on the comparing of the slope value to the first threshold, determining an offset value based on the second data, receiving, from an integrated circuit component, third data generated at a third time based on the first pyroelectric sensing element and the third pyroelectric sensing element, the third time being after the second time, receiving, from an integrated circuit component, fourth data generated based on the second pyroelectric sensing element and the fourth pyroelectric sensing element, based on the third data, the fourth data, and the offset value, sending, using the wireless communication component, event data.

15. The electronic device of claim 14, wherein the electronic device comprises a camera, and wherein the one or more computer readable media store processor executable instructions which, when executed using the one or more processors, cause the electronic device to perform operations comprising based on the third data, the fourth data, and the offset value, generating image data using the camera.

16. The electronic device of claim 14, wherein the electronic device comprises a camera, and wherein the one or more computer readable media store processor executable instructions which, when executed using the one or more processors, cause the electronic device to perform operations comprising based on the third data, the fourth data, and the offset value, powering on the camera.

17. The electronic device of claim 14, wherein the one or more computer readable media store processor executable instructions which, when executed using the one or more processors, cause the electronic device to perform operations comprising determining a first value based on the third data and the offset value, determining a second value based on the first value and the fourth data, and comparing the second value to a second threshold, wherein the sending of the event data is based on the comparing of the second value to the second threshold.

18. The electronic device of claim 14, wherein the one or more computer readable media store processor executable instructions which, when executed using the one or more processors, cause the electronic device to perform operations comprising determining a first value based on the third data and the offset value, determining a second value based on the fourth data, determining a third value based on adding the first value and the second value, and comparing the third value to a second threshold, wherein the sending of the event data is based on the comparing of the third value to the second threshold.

19. The electronic device of claim 14, wherein the one or more computer readable media store processor executable instructions which, when executed using the one or more processors, cause the electronic device to perform operations comprising determining a first value based on the third data and the offset value, determining a second value based on the fourth data, determining a third value based on subtracting one of the first value and the second value from the other, and comparing the third value to a second threshold, wherein the sending of the event data is based on the comparing of the third value to the second threshold.

20. The electronic device of claim 14, wherein the one or more computer readable media store processor executable instructions which, when executed using the one or more processors, cause the electronic device to perform operations comprising determining a first value based on the third data and the offset value, determining a second value based on the fourth data, determining a third value representing an absolute value of the first value, determining a fourth value representing an absolute value of the second value, determining a fifth value based on adding the third value and the fourth value, and comparing the fifth value to a second threshold, wherein the sending of the event data is based on the comparing of the fifth value to the second threshold.

21. The electronic device of claim 14, wherein the one or more computer readable media store processor executable instructions which, when executed using the one or more processors, cause the electronic device to perform operations comprising determining a first value based on the second data, comparing the first value to a second threshold, and wherein the determining of the slope value is based on the comparing of the first value to the second threshold.

22. A method comprising:

generating, at a first time, first data based on a first pyroelectric sensing element and a second pyroelectric sensing element;

generating, at a second time, second data based on the first pyroelectric sensing element and the second pyroelectric sensing element;

determining a slope value based on the first data and the second data;

based on comparing the slope value to a first threshold, determining an offset value using a first value indicated by the second data;

generating, at a third time, third data based on the first pyroelectric sensing element and the second pyroelectric sensing element, wherein the third time is after the first time and the second time;

determining a second value based on the third data;

based on comparing the second value to a second threshold, sending alert data using a wireless communication component.

23. The method of claim 22, wherein the method comprises generating fourth data based on a third pyroelectric sensing element and a fourth pyroelectric sensing element, wherein the second value is determined based on the fourth data.

24. The method of claim 22, wherein the second value is an absolute value determined based on the third data.

* * * * *